May 10, 1966     H. E. ZAHN ETAL     3,250,645
ANNULAR ELECTRIC CELL HAVING CENTRAL APPARATUS SPACE
Filed Oct. 22, 1962     2 Sheets-Sheet 1
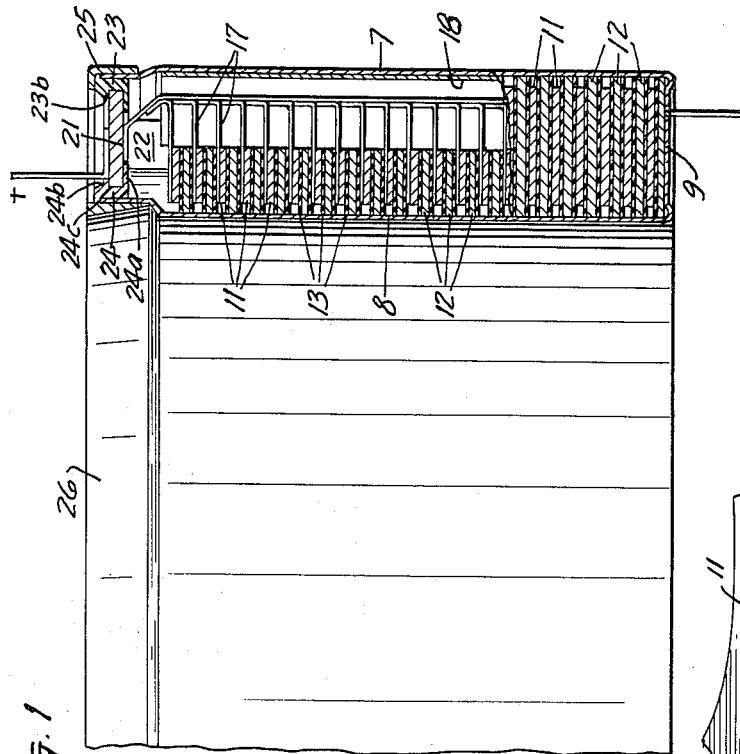
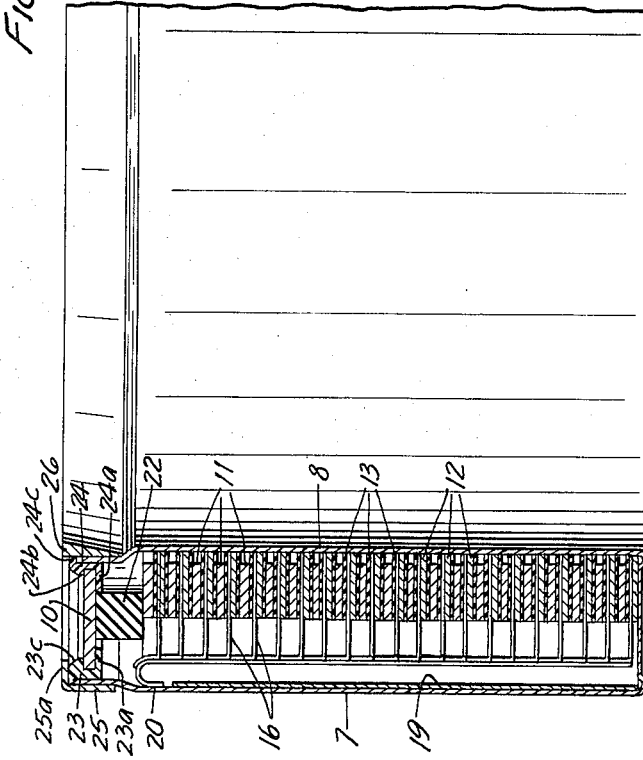
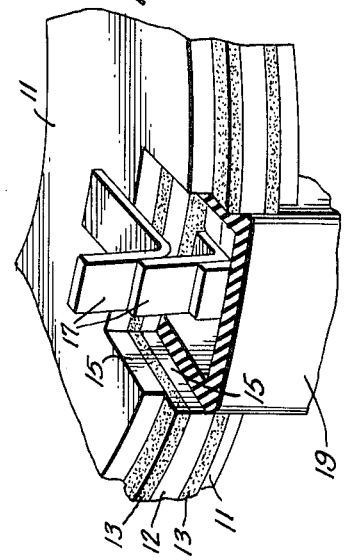
INVENTORS
HAROLD E. ZAHN
RAYMOND L. SCHENK, JR.
BY
ATTORNEY May 10, 1966 H. E. ZAHN ETAL 3,250,645
ANNULAR ELECTRIC CELL HAVING CENTRAL APPARATUS SPACE
Filed Oct. 22, 1962 2 Sheets-Sheet 2
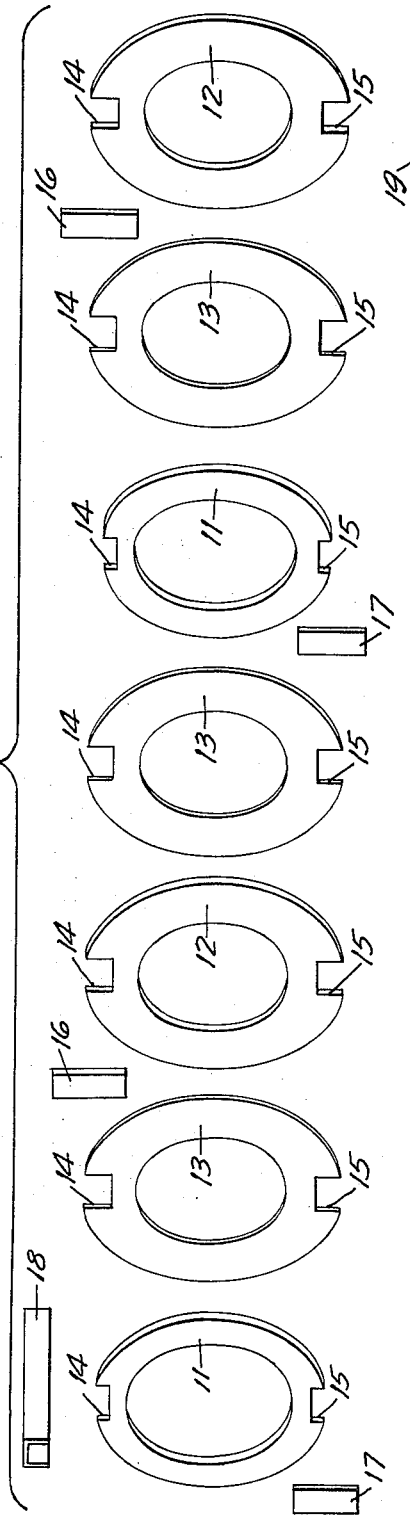
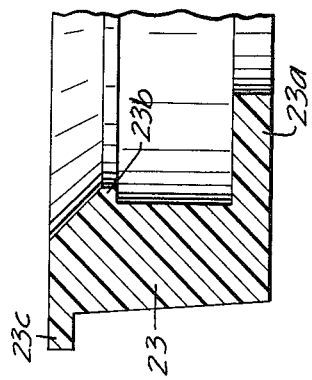
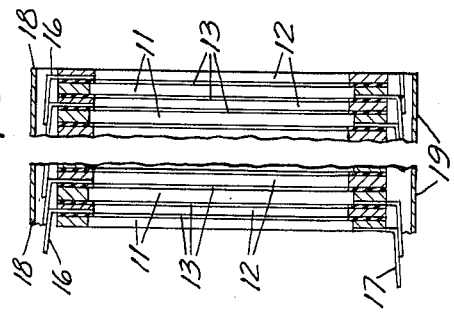
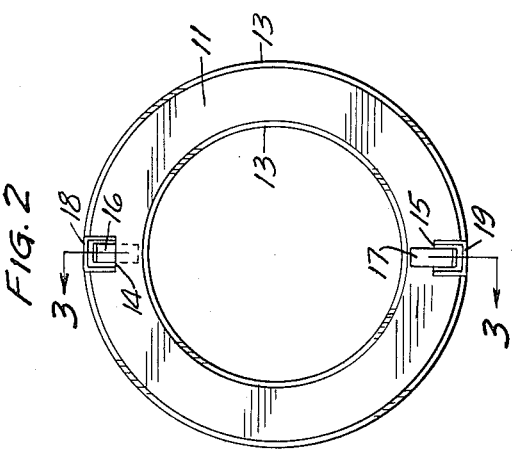
INVENTORS
HAROLD E. ZAHN
RAYMOND L. SCHENK, JR.
BY
ATTORNEY United States Patent Office 3,250,645
Patented May 10, 1966

3,250,645
ANNULAR ELECTRIC CELL HAVING CENTRAL APPARATUS SPACE
Harold E. Zahn, Edina, and Raymond Lyle Schenk, Jr., Minneapolis, Minn., assignors to Gould-National Batteries, Inc., St. Paul, Minn., a corporation of Delaware
Filed Oct. 22, 1962, Ser. No. 231,990
7 Claims. (Cl. 136—14)

This invention relates to annular electric cells or batteries adapted to encompass power operated equipment, apparatus or tools for which the cell or battery furnishes the power, and particularly to improvements over such cells or batteries having coiled electrodes.

It is an object of our invention to provide a novel, flat plate, high rate discharge and rechargeable cell of the class described.

A particular object is to provide a sealed alkaline battery cell having flat plates and separators contained in a generally tubular casing, the several plates having short grids and plate connecting tabs which are readily accessible for welding during the fabrication of the cell.

The invention also includes certain other novel features of construction which will be pointed out in the following specification and claims.

In the accompanying drawing which illustrates a preferred embodiment of our invention, by way of example and not for the purpose of limitation:

FIGURE 1 is a part central vertical sectional view through the plate connector tabs with the lower right-hand part being a fragmentary vertical sectional view taken on a diametral plane angularly displaced from the plane containing the tabs of one of our improved cells;

FIG. 2 is a top plan view showing a stack of the flat ring shaped electrodes or plates in assembled relation to separators, inter-plate connectors and insulating elements;

FIG. 3 is a fragmentary vertical sectional view taken on the line 3—3 of FIG. 2;

FIG. 4 is an exploded, perspective view showing typical internal elements of the cell;

FIG. 5 is a fragmentary vertical cross sectional view, on a larger scale, showing the cover sealing ring; and FIG. 6 is a fragmentary perspective view of a portion of the battery illustrating the terminal conductors and the relationship to the slots.

As shown in FIG. 1, our improved cell includes a metallic casing having a tubular outer wall 7, a coaxial tubular inner wall 8, spaced radially inwardly from the wall 7, a bottom end wall 9 which is shown integral with the walls 7 and 8, and an annular cover 10 having the form of a flat ring which is confined in sealing relation to the walls 7 and 8, as hereinafter described in detail.

Stacked within the casing in the annular space between the walls 7 and 8 are positive plates 11, negative plates 12 and separators 13, all of similar flat ring shape, arranged in conventional manner, with the separators interposed between the positive and negative plates, in contact therewith. As shown, the outside diameter of each of the positive plates is smaller than the outside diameter of the negative plates, and the inside diameter of the positive plates is larger than the inside diameter of the negative plates so that in the assembled cell the outer and inner peripheries of the positive plates are spaced from casing walls 7 and 8 respectively. For cells in which the tubular walls 7 and 8 of the casing are to be connected electrically to the negative plates, the inner and outer peripheries of negative plates may be disposed in contact with the tubular casing walls.

The spacing of the inner and outer peripheries, i.e. the inner and outer edges of the positive plates of ring form, from the walls 7 and 8 is shown in FIG. 1, lower right portion. As indicated in the description of FIG. 1, this portion of the drawing is a part vertical sectional view taken at an angle to the plane of the tabs shown in the other portions of the figure. Such spacing of the inner and outer edges or peripheries of the plates of one polarity from the casing effectively guards against short circuits that might otherwise be caused by contact of the plates of both polarities with the metal walls 7 or 8. The relative positions of the plates and separators in the casing are determined by the channel shaped insulators hereinafter described.

Preferably, the flat plates 11 and 12 embody foraminous, metallic grid supports and porous sintered metal layers carrying the active material, or the foraminous grids may be of the pasted type adapted to be die cut to the shapes and sizes illustrated. The separators 13 preferably have their outer and inner peripheries fitting loosely within the tubular casing walls.

As best shown in FIG. 4, slots 14 are formed in the outer peripheries of the plates 11 and 12 and separators 13 at one side, and similar slots 15 are formed in the outer peripheries of these elements at the opposite side. Each negative plate has a conductor tab 16 secured thereto, preferably by heat fusion or welding, at points radially inward from the slot 14, and conductor tabs 17 are similarly secured to the several positive plates 11 adjacent to the slots 15. To assemble the several plates with their tabs and separators, these elements are spaced in a suitable fixture or jig to form a stack containing the required number of plates, the several slots 14 being aligned at one side and the slots 15 aligned at the other side, with the several tabs projecting radially outward from the plates. The tabs are then bent vertically to overlap, one with another, in the slots 14 and 15, and are welded one to another or to a suitable collector strip or rod.

Channel shaped insulators 18 and 19 are provided to fit snugly in the aligned slots 14 and 15 respectively. These insulators are placed in the aligned slots as indicated in FIGS. 2 and 3, after the tabs 16 have been joined together in the slots 14, and tabs 17 have been joined together in slots 15, thereby providing insulated terminal conductors of opposite polarities. This stack of assembled plates, separators, tabs and insulating channels is then inserted in the open upper end of the casing between the walls 7 and 8, the chain of negative tabs is welded to the container wall, as indicated at 20 in FIG. 1, and the chain of positive plate tabs 17 welded to the lower side of the cover ring 10, as indicated at 21. A spacer of non-conducting material, such as that indicated at 22, or a spring may be inserted between the cover 10 and the top positive plate 11 to confine the stack of plates and separators against vertical movement in the casing.

In this assembly the channel shaped insulators 18 and 19 prevent relative rotary and lateral movement of the plates in horizontal planes so that the positive plates cannot make contact with the walls 7 or 8 of the metal container, and the negative tabs 16 and positive tabs 17 cannot make contact with the edges of plates of opposite polarity to cause short circuits.

Our cell closure and sealing members comprise the annular cover 10, an outer annular gasket 23, an inner annular gasket 24, an outer reinforcing ring 25 and an inner reinforcing ring 26. The gaskets 23 and 24 are formed from a hard plastic material which is resistant to cold flow. The gasket 23 has a first horizontally extending annular flange 23a which projects at the lower side of the cover 10, a second annular flange 23b which projects at the upper side of said cover, and a third peripheral flange 23c which projects above the upper edge of the tubular wall 7. Similarly, the inner gasket 24 has annular flanges 24a, 24b and 24c respectively projecting at the lower and upper sides of the cover 10, and at the upper edges of the inner tubular wall 8. The outer reinforcing ring 25 extends exteriorly of the upper marginal portion of the wall 7 and has a horizontal flange 25a which confines the flange 23c of the gasket 23 around the top rim of the cell. Reinforcing ring 26 is wedge shaped in cross section, having an annular outer surface which backs up the radially inward side of the wall 8 and an annular inner surface which converges downwardly relative to the back-up surface.

A suitable liquid electrolyte is charged into the casing prior to the closing and sealing operation. A press having dies adapted to exert radial compressive force inwardly on the ring 25 and to back up the inner surface of the wedge ring 26 is used in the final closing operation. In order to provide a permanent seal which will withstand thermal shock and high internal pressures in the cell, the cover 10 and reinforcing rings 25 and 26 are formed from steels having high tensile strength, and gaskets 23 and 24 are formed from a hard plastic material of which nylon sold under the trademark "Zytel" is an example.

After the compressive force is removed from the container, the gaskets 23 and 24 will exert radial compressive force outwardly against the container wall 7 and reinforcing ring 25 and inwardly on the container wall 8 and ring 24. This compressive force is substantially equal to but not greater than the yield strength of the metal of which the rings 24 and 25 are made. With such reinforcement it is feasible to form the casing walls 7, 8 and 9 from a relatively thin, malleable, corrosion resistant metal. During the radial sealing of the cell by a sizing die of smaller diameter, the upper marginal portions of the walls 7 and 8 may be offset radially so that the outer surface of the ring 25 is flush with the outer surface of the wall 7, and the inner surface of the ring 26 is flush with the inner surface of the wall 8, as indicated in FIG. 1.

Batteries of the nickel-cadmium or silver-zinc types, for example, may be constructed in accordance with our invention for operating power consuming electrical apparatus or components at least a portion of which may be contained, advantageously within the space encompassed by the inner tubular wall 8. Close tolerances in the inside and outside diameters of the several plates 11 and 12 may be maintained without difficulty by die cutting the plates to size so that they may be passed readily into the tubular casing. This is distinctly advantageous over coiled electrodes which are difficult to fabricate to close diameter tolerances due to the fact that relatively small variations in the electrode thickness are cumulative in the coil and result in various oval shapes and sizes which do not fit in cylindrical casings of a predetermined size.

The present invention meets the need for more efficient heat dissipation from the cell during charge and discharge, and is particularly adapted to operate power consuming components, such as motors or other electrical apparatus, the geometry of which has heretofore required the mounting of the battery at some distance from the power consuming component. The advantages of our invention may be realized by constructing the cell in any geometrical form having a central opening and inner and outer tubular walls from which the heat generated during high rate charge and discharge may be dissipated. Thus the form of our improved cell permits higher charging and discharge rates because of the more efficient heat dissipation and also permits minimum increase in bulk of the battery and component operated thereby.

A further important result of our stacked arrangement of flat plates and separators is the shortening of the length of the electrical path including the grid conductors for each plate for the flow of current to the terminal conductors. Thus the large number of collector tabs provide a short path of flow to and from the individual electrode grids. The cost of fabrication is also substantially reduced by our arrangement of the multiplicity of conductor tabs extending to the exterior of the stack where they are readily accessible for welding.

The term "tubular" as herein applied to the coaxial walls 7 and 8 is not limited to the cylindrical shapes illustrated, but is intended to include various geometrical shapes adapted to provide a central space of a shape suited to that of equipment to be contained therein.

We claim:

1. An electric cell of the sealed, rechargeable type comprising a casing having spaced, tubular, outer and inner side walls and annular end walls, said side walls being coaxially disposed one to the other and said inner side wall defining a central space, said space being shaped and arranged to receive and enclose apparatus to be operated by power from the cell; a liquid electrolyte in said cell; a plurality of flat ring shaped completely annular positive and negative plates and similarly shaped separators disposed in a stack in said cell; means sealing said casing against the escape of gas therefrom and positive and negative terminal conductors electrically connected to the positive and negative plates respectively.

2. A cell in accordance with claim 1 in which said side walls and end walls of said cell are metallic and at least one of said end walls being separated from said side walls by dielectric sealing rings, and in which said positive and negative terminal conductors are electrically connected respectively to said one end wall and to said side walls.

3. A cell in accordance with claim 1 in which said positive and negative plates and separators are severally formed with a first series of aligned slots disposed to receive said positive terminal conductor and with a second series of aligned slots disposed to receive said negative terminal conductor, and wherein said terminal conductors are severally confined in the respective series of aligned slots.

4. A cell in accordance with claim 3 including channel shaped insulators extending longitudinally in the respective series of aligned slots and severally disposed to separate said terminal conductors from one of said cylindrical walls of said casing.

5. A cell in accordance with claim 1 in which the plates of one polarity are of larger outside diameter and smaller inside diameter than the plates of the opposite polarity.

6. An electric cell in accordance with claim 1 in which at least one of said end walls comprises a ring shaped metallic cover, hard plastic gaskets embracing the outer and inner peripheries respectively of said cover within the confines of said outer and inner walls, an outer reinforcing ring embracing the outer surface of said outer wall, and an inner reinforcing ring embracing the inner surface of said inner wall, said reinforcing rings being disposed in radially spaced relation to the outer and inner peripheries respectively of said cover, and said gaskets being in a state of radial compression between said outer and inner walls and exerting a radial force substantially equivalent to but not greater than the yield strength of said reinforcing rings.

7. An annular electric cell in accordance with claim 6 in which said inner reinforcing ring is wedge shaped in cross section and has a substantially cylindrical back-up surface contacting the annular inner surface of said inner tubular wall.

References Cited by the Examiner

UNITED STATES PATENTS

| | | | |
|---|---|---|---|
| 2,296,778 | 9/1942 | Emanuel | 136—6 |
| 2,981,779 | 4/1961 | Freund | 136—90 |
| 3,079,454 | 2/1963 | McGinnis | 136—4 |
| 3,096,215 | 7/1963 | Voss et al. | 136—6 |
| 3,131,094 | 4/1964 | Cleveland | 136—90 |

WINSTON A. DOUGLAS, *Primary Examiner.*

MURRAY TILLMAN, *Examiner.*

B. J. OHLENDORF, *Assistant Examiner.*